UNITED STATES PATENT OFFICE.

OTTO JOSEPH THOMAS GUSTAVE RICHARD MARTIN, OF VANCOUVER, BRITISH COLUMBIA, CANADA.

LINING FOR FURNACES.

1,271,052.  Specification of Letters Patent.  Patented July 2, 1918.

No Drawing.  Application filed September 21, 1917.  Serial No. 192,604.

*To all whom it may concern:*

Be it known that I, OTTO JOSEPH THOMAS GUSTAVE RICHARD MARTIN, a subject of the King of Great Britain, and a resident of the city of Vancouver, in the Province of British Columbia, Canada, have invented a certain new and useful Composition of Matter to be Used for the Manufacture of Linings for Furnaces; and the object of my invention is to provide a composition which may be formed up into bricks or slabs capable of withstanding intense heat without burning out and which may be employed to great advantage for the linings of furnaces used for the electrical smelting of ore or like purposes.

My composition consists of the following ingredients combined in the proportions stated, viz:—

| | |
|---|---|
| Brick clay | 15 parts |
| Infusorial earth | 8 parts |
| Soapstone | 4 parts |
| Asbestos | 6 parts |

These ingredients are to be thoroughly mixed in powder form, and then thoroughly mixed with cold water, in which has been dissolved salt to the extent of one-quarter ($\frac{1}{4}$) ounce to the gallon, until the consistency is like that of stiff clay and capable of being easily pressed into molds.

The bricks or slabs formed by molding are then dried out in the usual manner for four or five days in a temperature of sixty (60) degrees, after which they are placed in brick kilns and burned hard.

By lining furnaces with bricks or slabs formed out of the above composition, smelting operations in which a great intensity of heat is required may be carried on successfully, as such lining will not burn out with the most intense heat.

I do not, however, confine myself to the exact proportions of the various ingredients as stated above, nor do I confine myself to the use of all the ingredients when making up the composition. For instance, the bricks or slabs could be made from a composition consisting of the brick clay and soapstone alone, or of the brick clay and infusorial earth alone, or of the brick clay and asbestos alone, each of which combinations would produce bricks which would give resistance to heat up to a certain degree, but with all the ingredients combined in the proper proportions, as set forth in the foregoing, the bricks resulting therefrom are capable of withstanding a far greater intensity of heat than those resulting from any of the combinations just mentioned.

What I claim as my invention is:—

1. The herein described plastic composition including brick clay and infusorial earth rendered plastic by water having dissolved therein salt in the proportion of one-quarter ounce to the gallon.

2. The herein described plastic composition including brick clay, infusorial earth, and soapstone.

3. The herein described plastic composition including brick clay, infusorial earth, soapstone, and asbestos.

4. The herein described plastic composition consisting of brick clay, infusorial earth, soapstone, asbestos and salt water.

5. The herein described plastic composition consisting of brick clay fifteen parts, infusorial earth eight parts, soapstone four parts, and asbestos six parts, rendered plastic by water having dissolved therein salt in the proportion of one-quarter ounce to the gallon.

Dated at Vancouver, B. C., this 4th day of September, 1917.

OTTO JOSEPH THOMAS GUSTAVE RICHARD MARTIN.